United States Patent
Hartman et al.

(10) Patent No.: US 10,086,853 B2
(45) Date of Patent: Oct. 2, 2018

(54) MOVABLE CABLE LOOP DESCENT SYSTEM

(71) Applicant: RIDE Inc., Drayton Valley, Alberta (CA)

(72) Inventors: Gregory A. Hartman, Drayton Valley (CA); Dan S. Smith, Drayton Valley (CA)

(73) Assignee: RIDE, INC., Alberta (CA)

( * ) Notice: Subject to any disclaimer, the term of this patent is extended or adjusted under 35 U.S.C. 154(b) by 428 days.

(21) Appl. No.: 15/015,505

(22) Filed: Feb. 4, 2016

(65) Prior Publication Data

US 2016/0159376 A1 Jun. 9, 2016

Related U.S. Application Data

(63) Continuation of application No. 13/576,543, filed as application No. PCT/CA2011/050055 on Feb. 1, 2011, now Pat. No. 9,272,166.

(60) Provisional application No. 61/300,179, filed on Feb. 1, 2010.

(51) Int. Cl.
  *B61H 9/02* (2006.01)
  *A62B 1/04* (2006.01)
  *A62B 1/08* (2006.01)

(52) U.S. Cl.
  CPC ............... *B61H 9/02* (2013.01); *A62B 1/04* (2013.01); *A62B 1/08* (2013.01); *H02K 2213/09* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 1,530,284 A | * | 3/1925 | Oliver | E21B 7/02 173/185 |
| 3,625,317 A | * | 12/1971 | Baermann | B61H 7/083 188/165 |
| 3,826,335 A | | 7/1974 | Allen | |
| 3,889,928 A | * | 6/1975 | David | B66D 1/48 188/161 |
| 3,946,989 A | * | 3/1976 | Tsuda | A62B 1/10 182/241 |

(Continued)

FOREIGN PATENT DOCUMENTS

| CA | 2057498 A1 | 6/1992 |
|---|---|---|
| CA | 2646073 A1 | 3/2009 |

*Primary Examiner* — Michael E Gallion
(74) *Attorney, Agent, or Firm* — William J. Clemens; Shumaker, Loop & Kendrick, LLP

(57) ABSTRACT

A movable cable loop descent system comprises a cable for forming into a loop, a receiver for attachment to a structure having a receiver pulley for engaging the cable loop, a brake assembly, having a drive pulley for being rotated by the cable loop, the brake assembly for slowing a rate of travel of the cable loop and a carriage supporting a load for attachment to the cable loop at a point and for movement between the structure and the ground. A rotor and substantially parallel conductive frame is mounted on an axle through the drive pulley. Magnets on a surface of the rotor and/or the frame induce eddy currents, as they are relatively rotated, which create a rotational braking force controlling descent of the carriage and load. The brake assembly may be removably positioned by a drive-on anchor. The cable is removable and the system may form a kit.

18 Claims, 9 Drawing Sheets

(56) References Cited

U.S. PATENT DOCUMENTS

| | | | | |
|---|---|---|---|---|
| 4,317,421 A | * | 3/1982 | Pollack | B63B 22/021 |
| | | | | 114/230.23 |
| 4,509,430 A | | 4/1985 | Creissels | |
| 4,512,438 A | | 4/1985 | Vilchek et al. | |
| 4,567,963 A | * | 2/1986 | Sugimoto | A62B 1/08 |
| | | | | 182/231 |
| 4,843,970 A | | 7/1989 | Feuz | |
| 5,172,640 A | | 12/1992 | Cathiard | |
| 5,477,094 A | * | 12/1995 | Lamb | H02K 49/046 |
| | | | | 310/105 |
| 5,791,442 A | | 8/1998 | Arnold | |
| 6,062,350 A | * | 5/2000 | Spieldiener | A63G 31/00 |
| | | | | 188/161 |
| 6,099,610 A | | 8/2000 | Palmer | |
| 7,178,644 B2 | * | 2/2007 | Kloft | H02K 49/046 |
| | | | | 188/161 |
| 8,272,476 B2 | * | 9/2012 | Hartman | A62B 1/08 |
| | | | | 182/11 |
| 8,556,234 B2 | * | 10/2013 | Hartman | A62B 1/08 |
| | | | | 182/10 |
| 8,851,235 B2 | * | 10/2014 | Allington | A62B 1/08 |
| | | | | 182/234 |
| 9,016,432 B2 | * | 4/2015 | Hartman | B60T 13/586 |
| | | | | 182/11 |
| 9,272,166 B2 | * | 3/2016 | Hartman | A62B 1/04 |
| 2007/0039788 A1 | | 2/2007 | Fulton | |
| 2009/0159373 A1 | * | 6/2009 | Hartman | A62B 1/08 |
| | | | | 187/350 |
| 2011/0114907 A1 | * | 5/2011 | Hartman | A62B 1/08 |
| | | | | 254/268 |
| 2013/0048422 A1 | * | 2/2013 | Hartman | A62B 1/08 |
| | | | | 182/10 |
| 2016/0245349 A1 | * | 8/2016 | Aoyagi | F16D 63/008 |

* cited by examiner

MOVABLE CABLE LOOP DESCENT SYSTEM

RELATED APPLICATIONS

This application is a continuation of U.S. patent application Ser. No. 13/576,543, filed on Aug. 1, 2012, which in turn is a National Stage of International Application No. PCT/CA2011/050055, filed Feb. 1, 2011, which in turn claims priority from U.S. Provisional Patent Application No. 61/300,179 entitled Movable Cable Loop Descent System, filed Feb. 1, 2010 by Gregory A. Hartman and Dan S. Smith, the entire disclosures of which are hereby incorporated herein by reference.

TECHNICAL FIELD

The present disclosure relates to a system for controlling the descent rate of a load attached to a cable, and more particularly, to a descent system for controlling the rate of descent of a load affixed to and suspended from a movable cable loop extending between a raised platform and the ground surface.

INTRODUCTION

In co-pending Canadian Patent Application No. 2,646,073 filed Dec. 9, 2008 by Hartman et al ("Hartman 1") and entitled DESCENT CONTROL DEVICE, which is incorporated by reference in its entirety herein, a magnetic descent control device is disclosed. The device provides braking capability to an enclosure for rapid but controlled transport of personnel from an elevated structure to a ground surface a distance away from the structure. The descent path of the enclosure is defined by at least one cable extending between an upper point affixed to the structure and a lower point affixed to the ground surface.

The device comprises a central axle affixed to a rotating driven sheave acting as a drive assembly, which grips the cable guiding the descent path of a body carrying cage. The central axle has a shoulder upon which rests a rotor. The rotor is encased within a front and back frame of conductive material. Disposed along at least one surface of the rotor or at least one of the conductors or both, is a series of magnets such that rotation of the rotor relative to the conductors creates relative motion between the magnets' magnetic field and the conductor and induces eddy currents in the conductor that oppose the magnetic field and create a rotational braking force. As a result, precise and controllable descent of the enclosure may be obtained with little or no mechanical wear or risk of overheating.

Each device is mounted on an inner surface of a side wall of the enclosure with the central axle passing through the side wall and being driven by a driven sheave in contact with the cable on the outer surface of the side wall. Hartman 1 discloses using a plurality of such devices to drive assemblies contacting a common cable and using at least two cables one on either side of the enclosure. The devices on each side of the enclosure are supported by a plurality of adjacent idler sheaves to impart tension to the cable where the driven sheaves engage it.

As a result of the foregoing, the minimum size, structure and composition of the side walls of the enclosure are constrained in that they are sufficiently large and rigid to support three or four sheaves thereon.

Since the devices pass through the side wall of the enclosure, which is maintained in a generally vertical orientation for the safe transport of personnel, the steepness of the angle of descent of the enclosure is also somewhat constrained, which imposes limitations on the positioning of the cable both at the elevated structure end and at the ground surface, especially given that at least two cables are used. Moreover, considerable site preparation may be called for to ensure that there remains clearance along the descent path for both the cable and the enclosure.

In co-pending U.S. patent application Ser. No. 12/617,999 filed Nov. 13, 2009 by Hartman et al ("Hartman 2") and entitled SINGLE CABLE DESCENT CONTROL DEVICE, which is incorporated by reference in its entirety herein, a single cable descent control device is disclosed. It comprises a rotor with corresponding frames of conductive material mounted on a common central axle on either side of a drive pulley. The pulley is adapted to sit above a single descent cable. A load is suspended from the device. Disposed along at least one surface of the rotor or of the corresponding frames or both, is a series of magnets such that rotation of the rotor relative to the frames induces eddy currents that oppose the magnetic field and create a rotational braking force providing precise and controllable descent of the enclosure with little or no mechanical wear or risk of overheating.

In this configuration, constraints on the side of the enclosure are dispensed with, as are corresponding limitations on the positioning and angle of descent of the cable. Further, significant labor and material savings in manufacturing the enclosure may be obtained from the resulting simplicity of design. The device may be used in numerous other applications, including without limitation, permitting controlled descent of gondolas or chairs from ski lift operations when normal lift operation is temporarily precluded.

Nevertheless, in both of these embodiments, the cable is fixed, in some example embodiments, permanently, to both the structure at the upper point and the ground surface at the lower point, under tension. Furthermore, because the brake forms part of the descending device, considerable effort is expended in raising the device, including the enclosure and the movable brake, from the ground surface to the structure after each use of the device.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

Like reference numerals are used in the drawings to denote like elements and features.

DESCRIPTION

Figure 1:
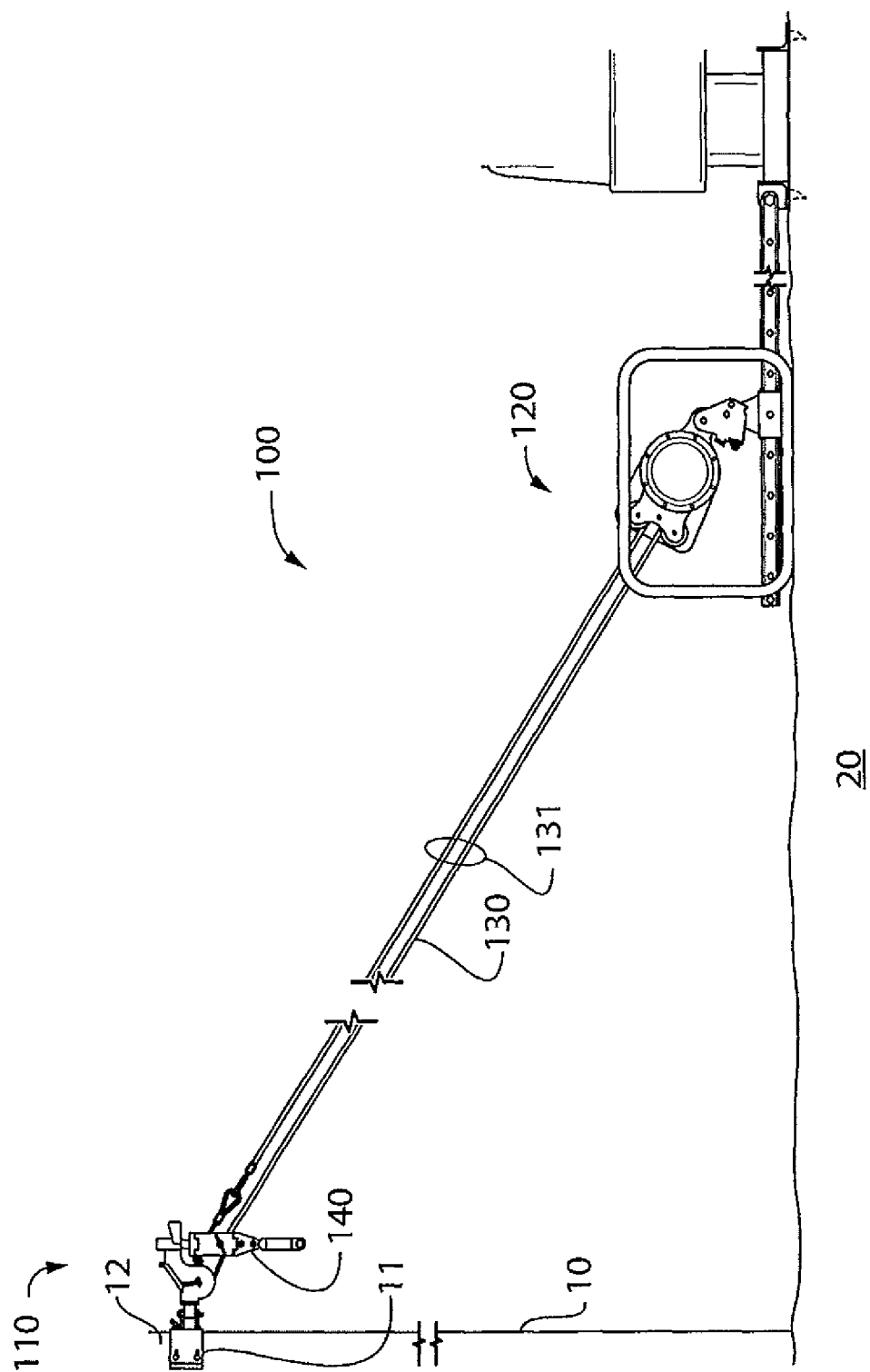
FIG. 1 is a brake side view drawing showing an example embodiment of a movable cable loop descent system according to the present disclosure.

The present disclosure provides an example embodiment of a movable cable loop descent system. Such descent system comprises a cable for forming into a loop, a receiver for attachment to a structure at an initial point, having a receiver pulley for engaging the cable loop around it, a brake assembly at a terminal point, having a drive pulley for engaging and being rotated by the cable loop, the brake assembly for slowing a rate of travel of the cable loop around the pulleys and a carriage for attachment to the cable loop at a point, for supporting a load and for movement between the initial point and the terminal point as the cable loop travels around the pulleys.

In some example embodiments, the drive pulley, the receiver pulley and the cable loop define and lie substantially in a common plane.

In some example embodiments, the receiver comprises a freely rotatable pulley about which the cable loop may be placed. In some example embodiments, the carriage may be removably secured to the receiver in a ready position to maintain the carriage proximate to the structure and available for use. In some example embodiments, the receiver comprises a magnet in a seat configured to engage a metal spigot of the carriage. The imposition of a load at the carriage causes the carriage to separate from the receiver and commence its descent along a path defined by a downstream portion of the cable loop. In some example embodiments, the receiver may be removably attached to a mounting bracket for affixing the receiver to the structure.

In some example embodiments, a plurality of idler sheaves inhibits slip between the cable loop and the drive pulley when under tension. In some example embodiments, the drive pulley and idler sheaves are mounted on a common plate which is adapted to pivot about a pivot point in a plane defined by the drive pulley in order to permit the cable loop to remain under a desired tension between the brake assembly and the receiver. In some example embodiments a tension indicator is provided for calibration purposes.

In some example embodiments, a rotor with a corresponding frame of substantially parallel conductive material is mounted on a transverse axle about which the drive pulley is rotatable. In some example embodiments, a series of magnets is disposed along at least one surface of the rotor or of the corresponding frame or both, such that rotation of the rotor in response to rotation of the drive pulley relative to the frame induces eddy currents that oppose the magnetic field and create a rotational braking force providing precise and controllable descent of the carriage and its supported load, with little or no mechanical wear or risk of overheating.

In some example embodiments, one of a plurality of co-axial drive pulleys of different diameter may be employed to vary the rate of rotation of the rotor relative to the rate of travel of the cable loop and thus adjust the applied braking force. In some example embodiments, the at least one idler sheave may have corresponding co-axial sheaves.

In some example embodiments, the brake assembly may be removably fixed in position by means of a drive-on anchor. In some example embodiments, minor positional adjustments may be made to the brake assembly relative to the drive-on anchor for purposes of maintaining a desired tension on the cable loop. In some example embodiments, a rotatable wheel crank may be employed to adjust the position of the brake assembly relative to the drive-on anchor.

In some example embodiments, the carriage accepts within it the cable loop at two places. The carriage is constrained to engage the cable loop and inhibit travel of the cable loop relative to a first place. In some example embodiments, the first place is proximate to where eyelets at opposing ends of the cable are joined together to form the cable loop. In some example embodiments, the first place is at a portion of the cable substantially between an eyelet at a first end of the cable and a cable grommet or cable clamp disposed on the cable and separated from the eyelet by a short distance. In some example embodiments, a cable grommet is placed at the same separation from the eyelet at each end of the cable. In some example embodiments, the second place is substantially vertically disposed from the first place on an opposite portion of the loop. In some example embodiments, the carriage permits substantially free travel of the cable loop at the second place. In some example embodiments, a secondary brake lever may be engaged during descent, causing a secondary brake to be driven against the cable loop at the second place and inhibiting travel of the cable loop relative to the second place.

As the carriage is constrained to engage the cable loop substantially at the first place and the cable loop is freely movable between the receiver and the brake assembly, under load, the carriage causes the cable loop to travel relative to the pulleys in the receiver and the brake assembly, causing the carriage to descend toward the ground surface. The rate of descent is constrained because the travel of the cable loop about the drive pulley causes the drive pulley and concomitantly the rotor to rotate, creating eddy currents that create a rotational braking force to slow the descent of the carriage in controlled fashion.

In some example embodiments, the load may comprise personnel or equipment or both suspended from a gripping portion such as a T-handle. The increase in load on the carriage causes the carriage to separate from the receiver and descend from the structure to the ground surface along the path defined by the cable loop.

The brake assembly is physically separated from the carriage, for example at ground level at or proximate to a low end of the cable loop. This permits the load to be borne by the carriage to be substantially restricted to the person or equipment being evacuated from the elevated structure. Additionally, this permits the carriage to have a compact size, be lightweight and be composed of a minimum of material, which in turn provides attendant benefits in terms of set-up, maintenance and operation. For example, the receiver may only restrain the carriage in the ready position with a small magnet, which is easily displaceable with the application of a small load on the carriage. Additionally, the path defined by the cable loop may be quickly reconfigured, by moving the position of the receiver relative to the elevated structure, by moving the position of the brake assembly along the ground surface or both. Further, separating the carriage from the brake assembly may reduce time, effort and expense of returning the carriage to the ready position proximate to the receiver after use. Still further, positioning the brake assembly at ground level may facilitate service and repair of the brake assembly.

The present disclosure may provide in some example embodiments a kit comprising a cable for forming into a loop, a receiver having a receiver pulley for engaging the cable loop around it at an initial point, a brake assembly having a drive pulley for engaging and being rotated by the cable loop at a terminal point, the brake assembly for slowing a rate of travel of the cable loop around the pulleys; and a carriage for securing to the cable and for supporting a load for movement between the initial point and the terminal point as the cable loop travels around the pulleys.

Reference is now made to FIG. 1, which illustrates a movable cable loop descent system 100. The descent system 100 comprises a receiver 110 for mounting to a structure 10, such as a monkey board or derrick, at an elevated point 11; a brake assembly 120, for positioning on or slightly above a ground surface 20 away from the structure 10; a cable 130 for forming into a loop 131 extending between the receiver 110 and the brake assembly 120 and a carriage 140 for attachment at a point along the cable loop 131 for transporting a load (not shown) between the receiver 110 and the brake assembly 120.

Figure 2:
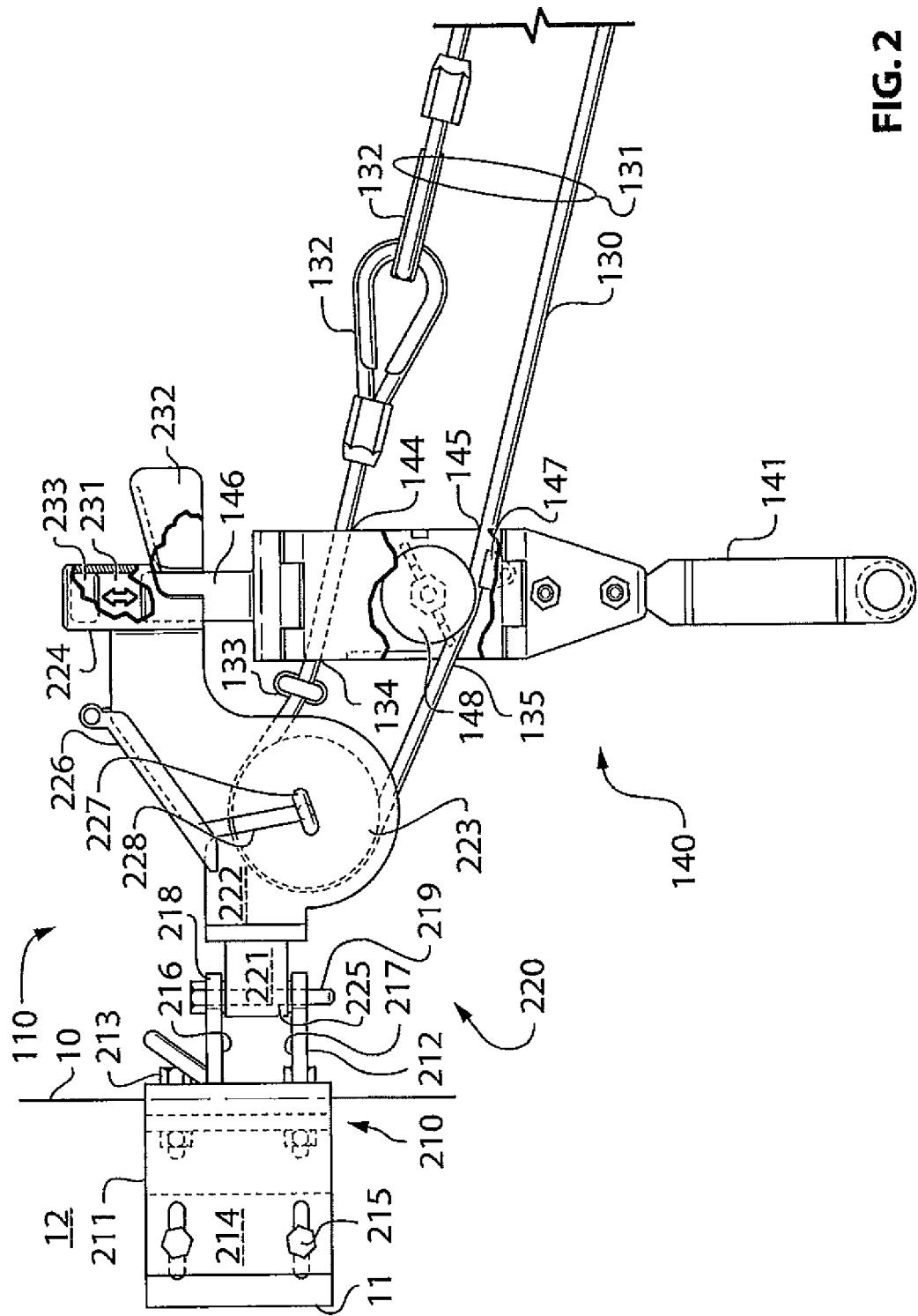
FIG. 2 is a brake side view of an example embodiment of a receiver, carriage and cable loop of the movable cable loop descent system of FIG. 1.

Referring now to FIG. 2, the receiver 110 comprises a receiver mount 210 and a receiver housing 220.

The receiver mount 210 comprises a securement portion 211 and a bracket 212. The securement portion 211 permits the receiver 110 to be securely fastened to the structure 10 at the elevated point 11. In some example embodiments, the securement portion 211 of the receiver mount 210 may be clamped by bolts 213 to a beam or other structural element 12 of the structure 10. The nature of the securement portion 211 of the receiver mount 210 may be adapted to engage a particular configuration of the structure 10 to which the receiver mount 210 is to be secured.

By way of non-limiting illustration only, in the example embodiment shown in FIG. 2, the securement portion 211 comprises a pair of L-shaped members 214 secured at one end by bolts 215. The members 214 may be positioned on either side of the structural element 12 of the structure 10 and secured thereto by the bolts 215. The members 214 may in some example embodiments be composed of steel.

The bracket 212 extends away from the structure 10 when the receiver mount 210 is secured thereto and permits the receiver housing 220 to be pivotally mounted to the receiver mount 210. By way of non-limiting illustration only, in the example embodiment shown in FIG. 2, the bracket 212 comprises a pair of protrusions 216, 217 each having a complementary and coaxial bore 218 passing transversely therethrough. The protrusions 216, 217 are spaced apart to accommodate a tongue 221 of the receiver housing 220 to pass between them. The protrusions 216, 217 may in some example embodiments be composed of steel cast with or in some example embodiments welded in position against a face of the member 213.

A bolt 219 passes through the bores 218 in each of the protrusions 216, 217 and through a complementary bore 225 of the tongue 221 of the receiver housing 220 to permit the receiver housing 220 to pivot along a plane relative to the receiver mount 210. In some example embodiments, the receiver mount 210 is secured to the structure 10 in an orientation such that the plane along which the receiver housing 220 may pivot is substantially horizontal, to accommodate positioning the brake assembly 120 laterally relative to the orientation of the receiver mount 210 as mounted on the structure 10.

The receiver housing 220 comprises a tongue 221, a pulley housing 222, the receiver pulley 223 and a receiver seat 224. The pulley housing 222 extends between the tongue 221 and the receiver seat 224. In some example embodiments, the tongue 221, pulley housing 222 and receiver seat 224 may be composed of steel. In some example embodiments, the tongue 221, pulley housing 222 and receiver seat 224 may be integrally formed. In some example embodiments, the pulley housing 222 and receiver seat 224 may be integrally formed and the tongue 221 welded thereto.

The tongue 221 has an internal bore 225 passing therethrough to accommodate the bolt 219 when positioned between the protrusions 216, 217 of the bracket 212 of the receiver mount 210.

The pulley housing 222 is a substantially circular portion of the receiver 220 within which the receiver pulley 223 may be seated. A hinged cover 226 opens to permit the receiver pulley 223 to be removed, for example, to permit the cable loop 131 to be wound around it. By way of non-limiting illustration, the example embodiment disclosed in FIG. 2 shows the cover 226 extending over the top (when in an operational configuration) of the pulley housing 222 so that the receiver pulley 223 may be inserted from above and seated within the pulley housing 222. In this fashion, once the receiver pulley 223 has been inserted into the pulley housing 222, the cover 226 may be closed to substantially protect the receiver pulley 223 from the elements and to secure the receiver pulley 223. In some example embodiments, the cover 226 may be composed of steel.

The pulley housing 222 accepts and supports an axle 227 of the receiver pulley 223. In some example embodiments, the pulley housing 222 comprises a pair of slots 228 extending from the cover 226 to an intermediate point at which the axle 227 is in operational position, to guide the axle 227 while the receiver pulley 223 is moved into position within the pulley housing 222. If, as in the non-limiting example embodiment illustrated in FIG. 2, the cover 226 extends from the top of the pulley housing, the axle 227 will be drawn to and tend to remain in the operational position by gravity. In other example embodiments, a mechanism to retain the axle 227 in the operational position against gravity, such as providing narrow shoulders (not shown) in the slots 228, may be appropriate.

A portion of the pulley housing 222 remains open to permit entry and exit of the cable loop 131 wound around the receiver pulley 223 when in position within the pulley housing 222. By way of non-limiting illustration, in the example embodiment shown in FIG. 2, the pulley housing 222 comprises a pair of parallel plates to accommodate the slots 228 and to substantially cover the faces of the receiver pulley 223, while remaining open along approximately half of its circular circumference to accommodate the entry and exit of the cable loop 131. In some example embodiments, slots or bores (not shown) in a closed circumferential surface (not shown) of the pulley housing 222 may provide similar access for entry and access. Such an alternative embodiment may further protect the receiver pulley 223, when seated in position within the pulley housing 222 from the elements, but may cause wear on the cable loop 131 as it is rotated about the receiver pulley 223, if the cable loop 131 comes into contact with the edges of any of the slots or bores.

The receiver pulley 223 is a pulley having a transverse axle 227 about which it is substantially freely rotatable. It is removable from the receiver housing 120 by opening the cover 226. Once removed, the cable loop 131 may be wound about the circumference of the receiver pulley 223 not under tension and then re-inserted into the pulley housing 222.

In some example embodiments, a groove (not shown) extends along the circumferential edge of the receiver pulley 223. In some example embodiments, the groove may be semi-circular in shape and sized to accept the cable loop 131 in a traction fit and so as to displace any debris that may have built up on the cable loop 131 such as snow, ice, grease, dirt, wax or the like.

In some example embodiments, the axle 227 is sized to slide within the slots 228 of the pulley housing 222 when inserting or removing the receiver pulley 223. In some example embodiments, once in operational position seated within the pulley housing 222, the axle 227 may be secured by nuts (not shown) or other appropriate mechanism. The receiver pulley 223 may be additionally secured within the pulley housing 222 by closing and securing the cover 226. Once the cover 226 has been closed and secured, the likelihood of the cable loop 131 slipping off the receiver pulley 223 is substantially minimized, especially with the provision of the circumferential groove.

The receiver seat 224 extends from the pulley housing 222 on the other side from the receiver mount 221. It is adapted to engage the carriage 140 in position proximate to the structure 10 until a load, such as personnel seeking to escape the structure, or equipment, or both, that exceeds a predetermined threshold, is applied to the carriage 140. Once such a load is applied, the carriage 140 is undocked from the receiver seat 224 and follow the path of the cable loop 131 downward toward the ground surface 20 near the braking assembly 120.

By way of non-limiting illustration, in the example embodiment shown in FIG. 2, the receiver seat 224 comprises a receptacle 231 and a channel defined by a pair of wings 232 extending from the receptacle 231 away from the pulley housing 222. The receptacle 231 is adapted to accommodate and retain a spigot 146 of the carriage 140 in a ready position proximate to the structure 10 to provide a mechanism for rapid egress from the structure 10 for personnel or equipment or both. In some example embodiments, the spigot 146 is composed of ferromagnetic material and the receptacle 231 houses a magnet 233 to magnetically engage the spigot 146 to maintain the carriage 140 in the ready position. The threshold load beyond which the carriage 140 may be released from the receiver seat 224 may be set by the magnetic field strength of the magnet 233 imposed upon the spigot 146.

The wings 232 serve to guide the carriage 140 away from the receiver 120. In some example embodiments, the wings 232 may have a slightly diverging profile to facilitate returning the carriage 140 to the ready position within the receiver seat 224 after use.

The receiver 110 secures the carriage 140 until a load (not shown), such as personnel or equipment or both is applied to the carriage, causing it to be released from the receiver 110 and to descend in controlled fashion along the path defined by the cable loop 131 to the ground 20 proximate to the brake assembly 120.

Figure 3:
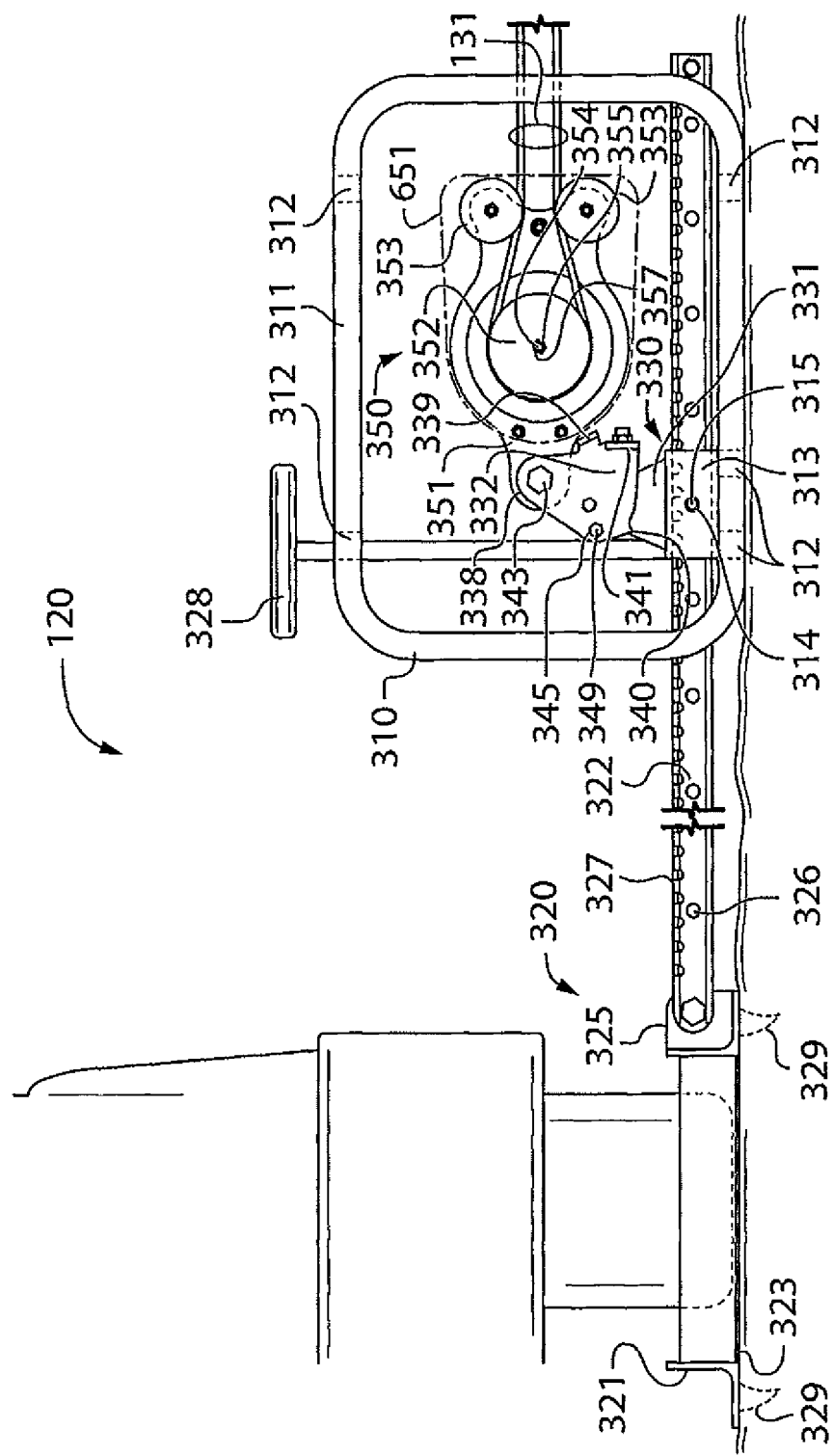
FIG. 3 is a pulley side view drawing of an example embodiment of a brake assembly and cable loop of the movable cable loop descent system of FIG. 1.
Figure 4:
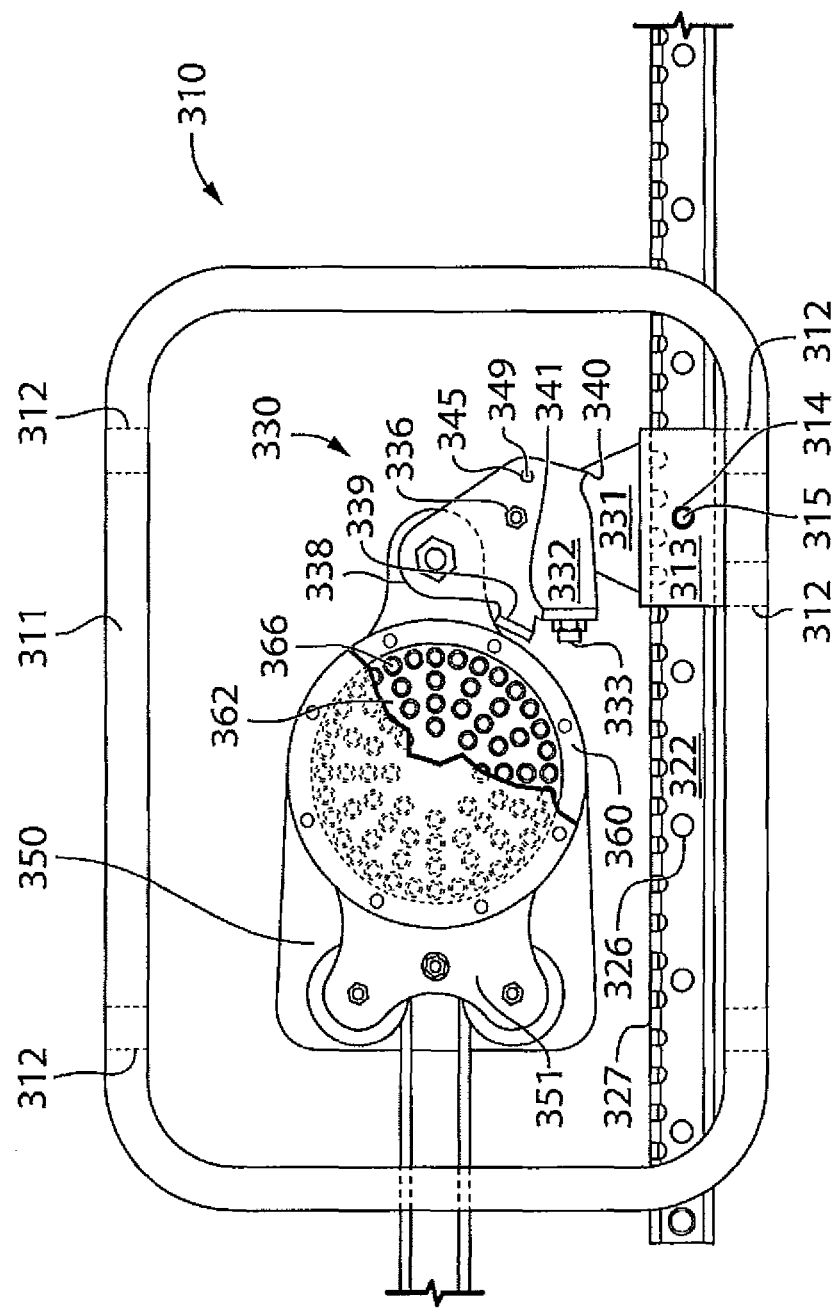
FIG. 4 is a brake side view drawing of the brake assembly of FIG. 3.

Turning now to FIG. 3, there is shown a side view of the brake assembly 120 viewed from the pulley side. The brake assembly 120 comprises a frame 310, an anchor 320, a brake mount 330, a drive pulley subsystem 350 and a brake 360 (FIG. 4).

The frame 310 is an open framework that substantially encloses and protects the rest of the brake assembly 120. By way of non-limiting illustration, in the example embodiment of FIG. 3, it comprises a pair of substantially rectangular sides 311, spaced apart by a plurality of cross beams 312 each comprising a segment of substantially equal length, secured thereto.

The substantially open nature of the frame 310 permits the cable loop 131 to enter and exit the brake assembly 120 from a wide variety of angles (corresponding to a wide variety of points 11 of different elevations where the receiver 110 is mounted to the structure 10) and permits the anchor 320 to extend from the frame 310 substantially without interference.

In some example embodiments, the sides 311 and cross beams 312 of the frame 310 may be composed of tubular steel. In some example embodiments, the sides 311 and cross beams 312 are welded together. In some example embodiments, the corners of the sides 311 may be rounded.

In some example embodiments, a tubular mount 313 is secured to the top of a plurality of cross beams 312 mounted to the bottom of the frame 310 and is adapted to accept a tubular tongue 322 of the anchor 320 in order to secure the frame 310 in position. Corresponding bores 314 on opposed sides of the mount 313 accept a pin 315 that may pass through them and a corresponding one of a number of bores 326 in the tongue 322 to secure the brake assembly 120 roughly in position relative to the anchor 320.

In some example embodiments, the mount 313 is composed of steel. In some example embodiments, the mount 313 is welded to the cross beams 312.

Figure 6:
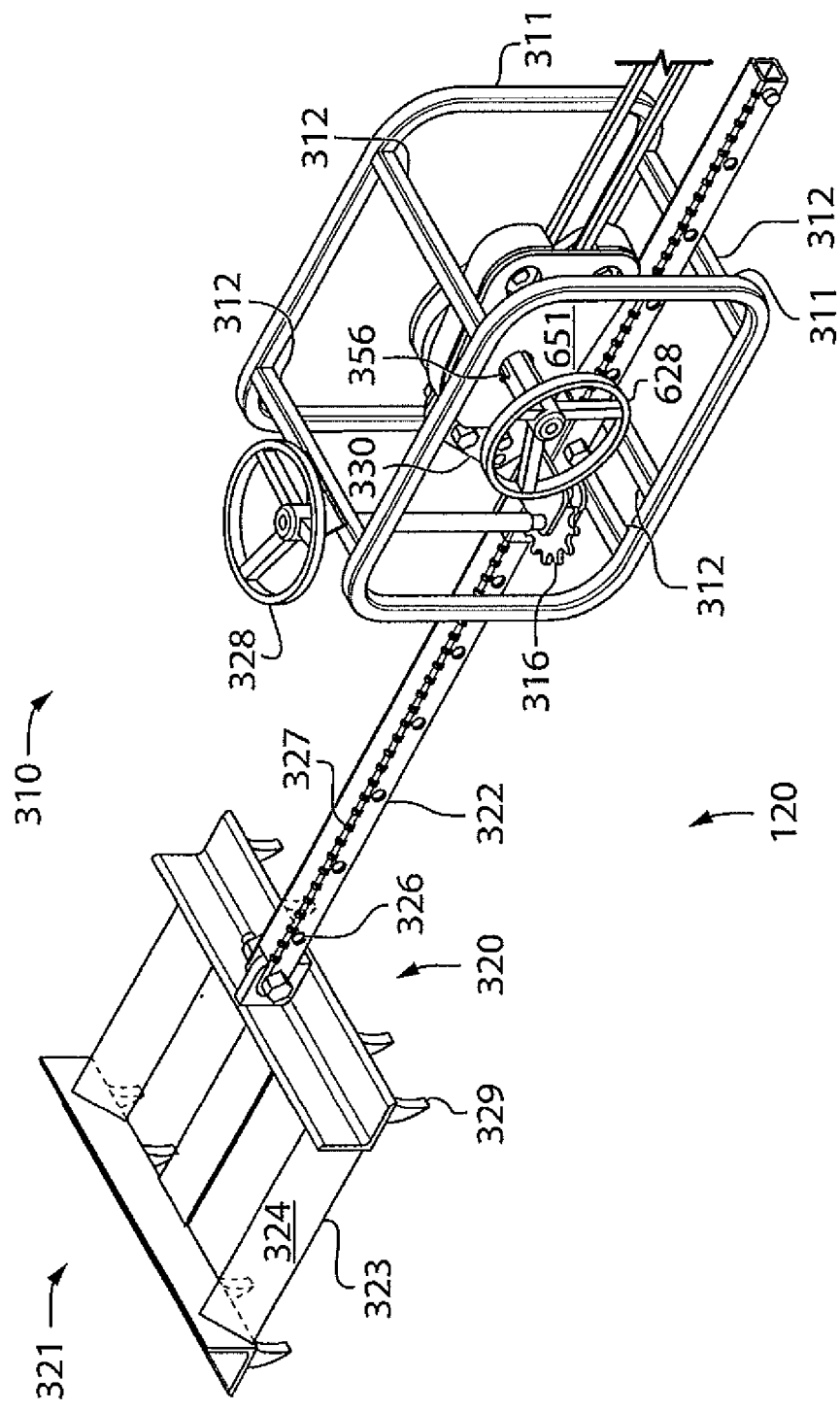
FIG. 6 is a pulley side perspective view drawing of the brake assembly of FIG. 3.

As shown by way of non-limiting illustration in FIG. 6, in some example embodiments, the mount 313 has secured thereon a toothed rotatable gear 316 to engage tooth-shaped indentations 327 in the tongue 322 of the anchor 320, so as to permit fine adjustment of the position of the brake assembly 120 relative to the structure 10 and to permit fine adjustment of the tension in the cable loop 131 extending between the brake assembly 120 and the receiver 110 secured to the structure 10. In some example embodiments, a wheeled crank 328 extends substantially upwardly from the gear 316 to permit easily rotation of the gear 316.

The anchor 320 and comprises a ground surface engaging pad 321 and an adjustable tongue 322. The pad 321 may be substantially planar having a ground-engaging surface 323. In some example embodiments, the ground-engaging surface 323 may comprise a plurality of downwardly-extending spikes 329 to engage the ground surface 20, including turf, snow or ice.

The pad 321 may be secured in place by driving a wheel of a vehicle such as a truck, over the pad 321 in a direction transverse to the direction of extension of the tongue 322, anchoring the pad 321 in place in a ground-engaging fashion by applying a downward force onto the pad 321. In some example embodiments, the pad 321 may comprise a plurality of vertical ridges to constrain the wheel to approach the pad in the transverse direction.

In some example embodiments, the pad 321 may contain a plurality of spring-loaded louvers 324 (FIG. 6), which constrain the wheel to approach the pad 321 from an initial direction and proceed in the same direction to exit the pad 321. Additionally, the louvers 324 provide some transverse stability to restrict the ability of the wheel from sliding off in the opposite direction. In some example embodiments, at least one louver 324 may be oriented in an opposing direction to restrict the ability of the wheel from unintentionally departing the pad 321 in either transverse direction. When the wheel is to depart the pad 321, the opposed louver 324 may be depressed manually to permit the wheel to drive over it and depart the pad 321.

The pad 321 may be configured to accept the tongue 322. In some example embodiments, a bracket 325 extends above the pad 321 and is adapted to secure the tongue 322 to the pad 321. In some example embodiments, the tongue 322 is secured in a pivoting manner to the bracket 325.

In some example embodiments, the pad 321 is composed of steel.

The tongue 322 comprises an elongate member which may be accepted by the mount 313 in a sliding fit. The tongue 322 comprises a plurality of spaced-apart bores 326 along its length adapted to accept the insertion of the pin 315 therethrough to secure the tongue 322 to the mount 313 to maintain the brake assembly 320 roughly in position relative to the structure 10. As shown by way of non-limiting illustration, in the example embodiment of FIG. 3, the tongue 322 is composed of tubular steel.

As shown by way of non-limiting illustration in FIG. 3, the tongue 322 may comprise a regular tooth pattern of indentations 327 adapted to engage the teeth of the gear 316 (FIG. 6) secured to the mount 313 of the frame 310, to permit fine adjustment of the position of the brake assembly 120 relative to the structure 10 and to permit fine adjustment of the tension in the cable loop 131 extending between the brake assembly 120 and the receiver 110 secured to the structure 10.

Figure 5:
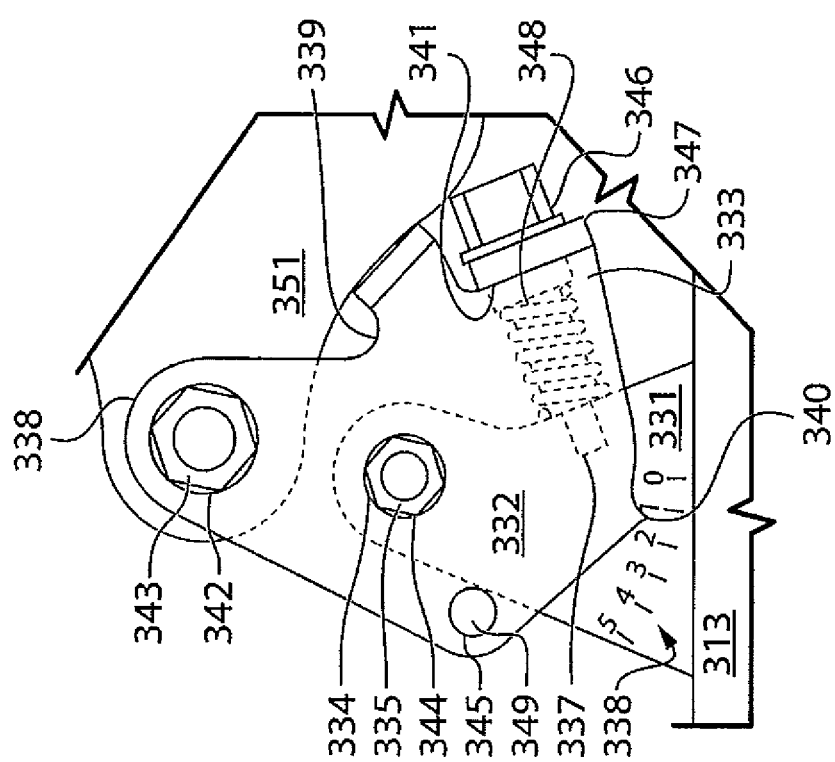
FIG. 5 is an expanded view of the tensioning mechanism of the brake assembly of FIG. 4.

As may be better seen in FIGS. 3 through 5, the brake mount 330 comprises a base 331, at least one pivot plate 332 and a tensioner 333. The base 331 extends substantially vertically from the mount 313 and extends, in a substantially vertical plane, to engage in parallel fashion, the at least one pivot plates 332. Further, tensioner 333 is secured to the base 331 as described below.

Base 331 comprises a protrusion at a distal end from the mount 313, through which a transverse bore 334 passes. The transverse bore 334 is sized to accommodate a pivot bolt 335 passing through the at least one pivot plate 332 and the base 331. In some example embodiments, there are two pivot plates 332 and each is disposed to one side of the base 331. The at least one pivot plates 332 and the base 331 are secured together by the pivot bolt 335 and a complementary nut (not shown).

By way of non-limiting illustration, in the example embodiment of FIG. 5, base 331 may have a partial bore 337 in an end (in a direction facing the structure 10, which, for illustration, is designated as the front end) to accommodate insertion and securement therein of the tensioner 333. In some example embodiments, the partial bore 337 is threaded to engage a bolt 346 of the tensioner 333.

In some example embodiments, the base 331 may have a grid of markings 338 on at least one side, extending beyond the corresponding pivot plate 332, which acts as a scale indicating a tension setting applied to the cable loop 131 by adjustment of the tensioner 333 as discussed below.

In some example embodiments, the base 331 is composed of steel. In some example embodiments, the base 331 is welded to a top surface of the mount 313.

Each pivot plate 332 is a planar plate having first 338 and second fingers 339 at one extremity thereof. At another extremity thereof, a protrusion 340 extends outwardly in the plane of the pivot plate 332, which cooperates with the grid of markings 338 to indicate the tension setting applied to the cable loop 131. Between the second finger 339 and the protrusion 340 lies a shelf 341.

The first finger 338 has an offset bore 342 passing through it. The offset bore 342 is sized to accommodate a pulley bolt 343 passing through it and a pulley plate 351 of the drive pulley subsystem 350 to secure the pulley plate 351 to the pivot plate 332. The second finger 339 provides a support offset from the first finger 338 against which an edge of the pulley plate 351 may rest.

In addition to the offset bore 342, the pivot plate 332 has a central bore 344 passing substantially through its centroid. The pivot plate 332 is secured by bolt 335 and nut 336 passing through the central bore 344 and through the bore 334 of the base 331. Despite being so secured, the pivot plate 332 may pivot slightly relative to the base 331 as tension is applied to it by the cable loop 131 wound around the drive pulley 352 of the drive pulley subsystem 350.

The shelf 341 provides a surface against which the tensioner 333 may rest.

Between the protrusion 340 and the first finger 338, a blocking bore 345 is positioned near an edge of the pivot plate 332. The blocking bore 345 is sized to accommodate a crosspiece 349 that interconnects each of the at least one pivot plates 332 positioned on either side of the base 331. The crosspiece 349 restricts the extent to which the pivot plates 332 may pivot forward relative to the base 331. In some example embodiments, the bores 345 extend partially through the pivot plate 332 and the crosspiece 349 is secured in position by bolt 335 and nut 336 pulling the pivot plates 332 together against each side of the base 331. In some example embodiments, the bores 345 extend completely through the pivot plate 332 and the crosspiece 349 is secured by a nut (not shown) tightened against threaded ends of the crosspiece 349. In some example embodiments, the blocking bores 345 are internally threaded, permitting the threaded ends of the crosspiece 349 to be secured thereto.

In some example embodiments, each of the pivot plates 332 may be composed of steel.

As may be better seen in FIG. 5, the tensioner 333 comprises a bolt 346, a washer 347 and a biasing element 348, such as a spring. The bolt 346 is sized to be accommodated within the partial bore 337, with the biasing element 348 positioned, such as by surrounding the threaded portion of the bolt 346, between the head of the bolt 346 and the mount 331. In some example embodiments, the bolt 346 is secured by engaging the interior threads of the partial bore 337. The washer 347 is positioned around the threaded portion of the bolt 346, interposed between the biasing element 348 and the head of the bolt 346. The head of the bolt 346 and the washer 347 rest on the shelf 341. Thus, as the bolt 346 is tightened, the biasing element 348 compresses between the washer 347 and the mount 331. The tensioner 333 serves to calibrate the grid of markings 338 to the applied tension of the cable loop 131. In some example embodiments, once so calibrated, other than periodic or intermittent adjustments from time to time, the tensioner 333 is not further adjusted.

Rather, as the anchor 320 is positioned relative to the structure 10, coarsely adjusted by selecting a bore 326 of the tongue 322 at which to secure the mount 313 and/or finely adjusted by using the gear 316 against the indentations 327, the pivot plates 332 are forced rearwardly of the mount 331, causing the pulley plate 351 to be rotate lower, thus increasing the tension applied to the cable loop 131 wound around the drive pulley 352 and the receiver pulley 223. A relative indication of the tension applied to the cable loop 131 is provided by the position of the protrusion 340 relative to the grid of markings 338 as the pivot plates 332 are forced rearwardly.

As may be better seen in FIGS. 3 and 5, the drive pulley subsystem 350 comprises a pulley plate 351, a drive pulley 352, at least one idler sheave 353, a transverse axle 354 and a cover 651 (FIG. 6). The drive pulley 352 is positioned at an intermediate point of the pulley plate 351 and on one side thereof. The at least one idler sheave 353 is positioned on the same side of the pulley plate 351 as the drive pulley 352 and forward of the drive pulley 352, so that the drive pulley 352 lies between the at least one idler sheave 353 and the pivot plate 332.

The pulley plate 351 is a substantially planar plate having a transverse bore 355 sized to accommodate the transverse axle 354 driven by the drive pulley 352 to engage and drive the rotor 362 of the brake 360 on the other side of the pulley plate 351.

The pulley plate 351 is sandwiched between the at least one pivot plates 332 above the mount 331 and secured to the at least one pivot plates 332 by the pulley bolt 343. In some example embodiments, the pulley plate 351 may be composed of 6061-T6 aluminum, or steel, especially if magnets 366 are positioned on the face opposite the face upon which the drive pulley 352 is mounted, as discussed below in connection with the brake 360. In some example embodiments, such opposite face of the pulley plate 351 may be cladded or inserted with a material such as copper so as to alter the patterns or intensity or both of eddy currents induced therein by operation of the brake 360 as described below.

The drive pulley 352 is a pulley rotatable about and in fixed rotational engagement with the transverse axle 354. In some example embodiments, at the center of the drive pulley 352, a key 357 is cut to accept the transverse axle 354 and one of the at least one shoulders 356 (FIG. 6) situated thereon in such a manner to maintain the drive pulley 352 is in fixed rotational engagement with the axle 354.

In some example embodiments, a groove 852 (FIG. 8) extends along the circumferential edge of the drive pulley 352. In some example embodiments, the groove 752 may be semi-circular in shape and sized to accept the cable loop 131 in a traction fit and so as to displace any debris that may have built up on the cable loop 131 such as snow, ice, grease, dirt, wax or the like.

To further assist in the removal or snow, ice, grease, dirt, wax or the like, and to increase heat dissipation when the cable loop 131 moves through the circumferential groove (not shown), the drive pulley 352 may in some example embodiments include a series of channel bores (not shown) extending parallel to the axis of rotation near the circumferential end surface of the drive pulley 352.

Figure 8:
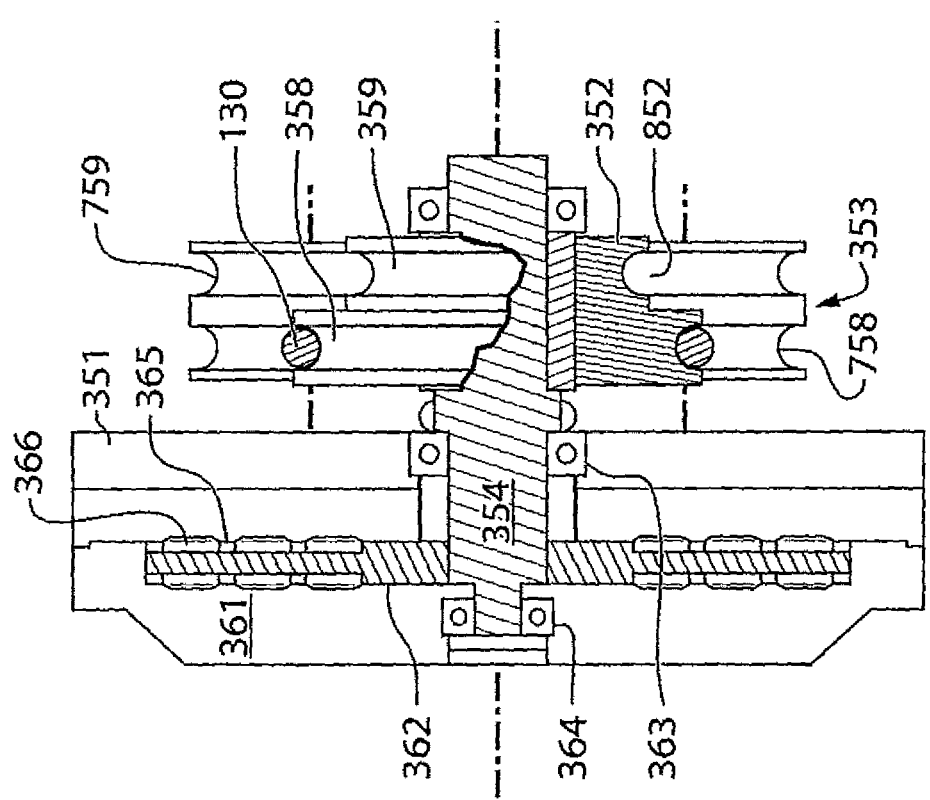
FIG. 8 is a rear cross-sectional view of the brake mechanism of the example embodiment of FIG. 3.

As may be better seen in FIG. 8, in some example embodiments, the drive pulley 352 comprises a pair of adjacent coaxial pulleys of differing diameter. In some example embodiments, the pulley of greater diameter 358 lies between the pulley plate 351 and the pulley of lesser diameter 359. The different diameter pulleys 358, 359 may be employed to cover a wide range of angles of descent of the carriage and minimize the amount of tension adjustment employed.

This is because as the angle of descent is increased, a greater braking force is called for, as discussed below. By reducing the size of the drive pulley 352, for a given rate of descent, the rotational rate of the drive pulley 352 and thus the rotor 362 increases, creating an offsetting increased braking force. To some degree, the angle of descent is correlated to the elevation of the receiver 110. Thus, by way of non-limiting example, a pulley 359 of the drive pulley 352 having a diameter of 5.5 inches may be suitable for elevations of the receiver 110 of substantially between 10 and 30 meters, while a pulley 358 of the drive pulley 352 having a diameter of 8 inches may be suitable for elevations of the receiver 110 of substantially between 8 and 10 meters.

Figure 7:
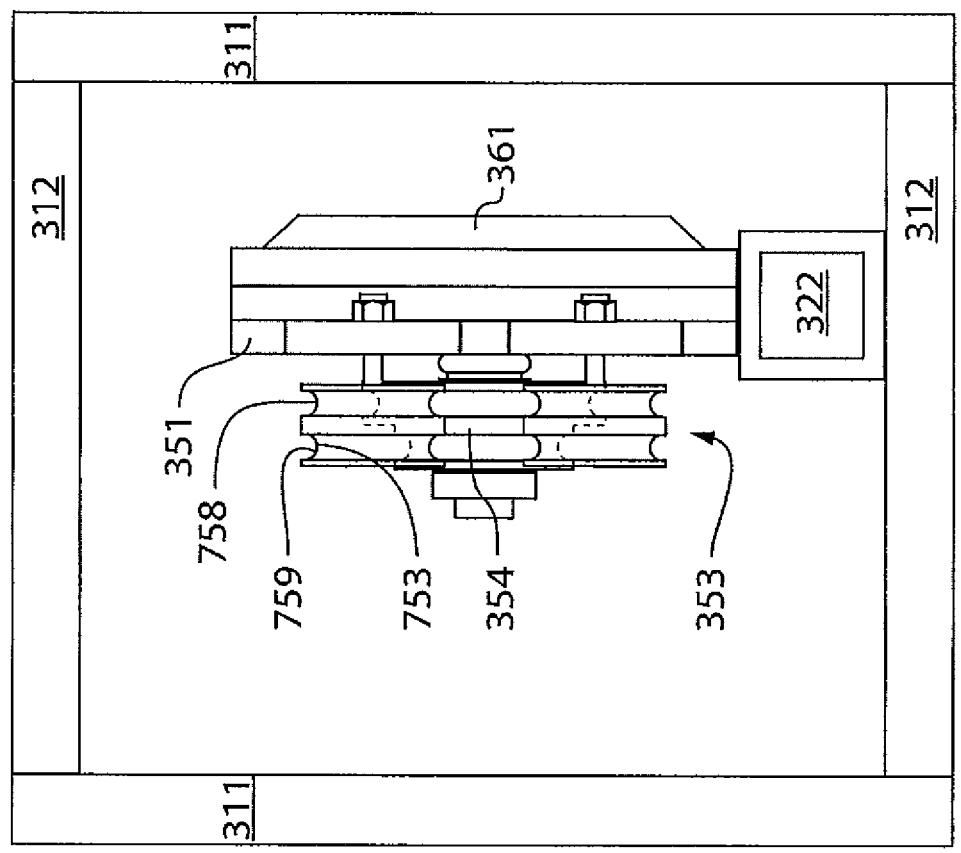
FIG. 7 is a front view drawing of the brake assembly of FIG. 4 with cover and cable loop removed.

The at least one idler sheave 353 is mounted on the same side of the pulley plate 351 as the drive pulley 352. In some example embodiments, a groove 753 (FIG. 7) extends along the circumferential edge of the at least one idler sheave 353, which is sized to accommodate the cable loop 131 therewithin.

In some example embodiments, the groove 753 may be semi-circular in shape and sized to accept the cable loop 131 in a traction fit and so as to displace any debris that may have built up on the cable loop 131 such as snow, ice, grease, dirt, wax or the like.

To further assist in the removal or snow, ice, grease, dirt, wax or the like, and to increase heat dissipation when the cable loop 131 moves through the circumferential groove 753, the at least one idler sheave 353 may in some example embodiments include a series of channel bores (not shown) extending parallel to the axis of rotation near the circumferential end surface of the at least one idler sheave 353.

The cable loop 131 is not wound about the at least one idler sheave 353. Rather, each idler sheave 353 applies pressure to the cable loop 131 to inhibit slip between the cable loop 131 and the drive pulley 352 when under tension and to facilitate rotation of the cable loop 131 (under load of the carriage 140 and any personnel or equipment or both suspended from it) driving rotation of the drive pulley 352 and concomitantly the transverse axle 354 in order to drive rotation of the rotor 362 in order to control or slow or both descent of the carriage 140 from the receiver 110 toward the brake assembly 120.

In some example embodiments, the idler sheave 353 comprises a pair of adjacent coaxial sheaves 758, 759 (FIG. 7), which lie substantially in a common plane with the pulleys 358,359 respectively. As opposed to the pulleys 358,359, the adjacent sheaves 758, 759 may not be of different diameter, although in some example embodiments, they may be of different diameter. In some example embodiments, the sheave 758 corresponding to the pulley of greater diameter 358 may be of lesser diameter than the sheave 759 corresponding to the pulley of lesser diameter 359.

With the cable loop 131 wound around the circumference of the drive pulley 352, and with pressure being applied to the cable loop 131 by the operation of the at least one idler sheave 353, when the cover 651 is in place, the likelihood of the cable loop 131 slipping off the drive pulley 352 is substantially minimized, especially with the provision of the circumferential groove 752.

The transverse axle 354 is a substantially elongate axle of substantially circular cross-section. In some example embodiments, in order to permit the axle 354 to be rotated by rotation of the drive pulley 352 and to concomitantly drive rotation of the rotor 362, without being significantly hampered by the transverse bore 355 in the pulley plate 352, the axle 354 may comprise at least one shoulder 356 that extends radially outward along a portion of the surface of the axle 355, corresponding to the position along the axle 354 about which the drive pulley 352 or the rotor 362 or both may be mounted, to mate with corresponding keys 357, 367 in the drive pulley 352 or the rotor 362 or both. In some example embodiments, the at least one shoulder 356 terminates before the position along the axle 354 about which the pulley plate 351 is positioned, so as to permit substantially free rotation within the transverse bore 355 of the pulley plate 351.

The brake 360 comprises a back cover 361 and at least one rotor 362 and extends on a side of the pulley plate 351 opposite to the drive pulley 352 and the at least one idler sheave 353.

The back cover 361 engages the pulley plate 351 to form a conductive cavity region. In some example embodiments, the back cover 361 is secured to the pulley plate 351 at points radially distal from the enclosed rotor 362 to form a frame of substantially parallel conductive material around the rotor 362. In some example embodiments, the points of contact between the back cover 361 and the pulley plate 351 may include a double lip seal installed on the pulley plate 351 to keep contaminants away from the cavity region.

The back cover 361 is formed of a conductive material, which in some example embodiments may be 6061-T6 aluminum, or steel, especially if magnets 366 are positioned on the interior face of the back cover 361, as discussed below. In some example embodiments, the interior face of the back cover 361 may be cladded or inserted with a material such as copper so as to alter the pattern or intensity or both of the eddy currents induced therein by operation of the brake 360 as described below.

The back cover 361 is formed in a shape to enclose and to accept a distal end of the transverse axle 354 and the rotor 362 mounted thereon without contacting any part of the rotor 362.

The cavity region defined by the back cover 361 and the pulley plate 351 accommodates the rotor 362 lying in a plane substantially parallel to the plane of the pulley plate 351 and substantially normal to the axis of the transverse axle 354 passing through the transverse bore 355 of the pulley plate 351, without the rotor 362 contacting either the pulley plate 351 or the back cover 361, so as to permit free rotation of the rotor 362 relative to the pulley plate 351 and the back cover 361. The rotation of the rotor 362 relative to the pulley plate 351 and the back cover 361 induces eddy currents in either or both of the pulley plate 351 and the back cover 361 which serve to impart a braking force to the rotation of the drive pulley 352 through the transverse axle 354 and concomitantly to the carriage 140 secured to the cable loop 131 and bearing a load comprising personnel or cargo or both.

A flange bearing 363 positioned about the transverse axle 354 between the rotor 362 and the drive pulley 352 secures the axial position of the pulley plate 351 relative to the transverse axle 354 without substantially impeding rotational movement of the axle 354 relative to the pulley plate 351 and serves as a spacer maintaining spacing between the rotor 362 and the pulley plate 351 and maintaining the rotor 362 in a plane substantially parallel to the pulley plate 351. The flange bearing 363 may comprise a ball bearing, bushing, spacer, sleeve, coupling or other such element or a combination of one or more of such elements. In some example embodiments, one or more of the flange bearings 363 is a ball bearing.

The back cover 361 may be secured in position relative to the transverse axle 354 on the other side of the rotor 362 by a back bearing 364 positioned about the axle 354, without substantially impeding rotational movement of the axle 354 relative to the back cover 361. Additionally, the back bearing 364 serves as a spacer maintaining spacing between the rotor 362 and the back cover 361 and maintaining the rotor 362 in a plane substantially parallel to the back cover 361. The back bearing 364 may comprise a ball bearing, bushing, spacer, sleeve, coupling or other such element or a combination of one or more of such elements. In some example embodiments, one or more of the back bearings 363 is a ball bearing. In some example embodiments, the flange bearing 363 and back bearing 364 cooperate, in some example by one contacting an inner race of the other, to support the rotor 362 in an orientation substantially normal to the transverse axle 354 and substantially parallel to the planes of the pulley plate 351 or back cover 361 or both.

Figure 9:
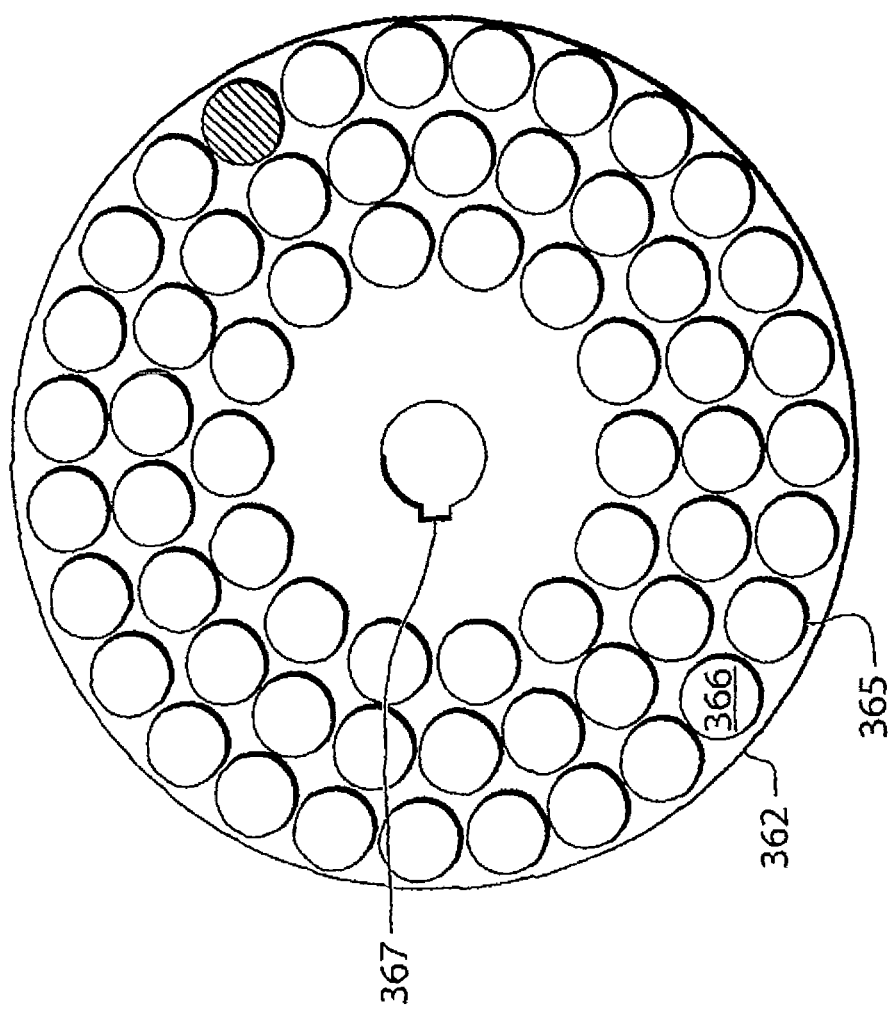
FIG. 9 is a plan view of an example embodiment of a rotor for use in the brake mechanism of the example embodiment of FIG. 8.

Turning now to FIGS. 4 and 9, an example embodiment of the rotor 362 is described. The rotor 362 is a cylindrical disk with a key-shaped bore 367 to accommodate the transverse axle 354 in fixed rotational engagement.

The rotor 362 is proximate to and spaced apart from the pulley plate 351 by the flange bearing 363 and proximate to and spaced apart from the back cover 361 by the back bearing 364.

In some example embodiments, the surface of the rotor 362 may be spaced substantially 0.040" from the pulley plate 351. In some example embodiments, the surface of the rotor 362 may be spaced substantially the same or a similar distance from the back cover 361.

In some example embodiments, the rotor 362 is composed of ferromagnetic steel. Alternatively, the rotor 362 may be composed of aluminum, copper, laminated steel, and copper or plastic, especially if the pulley plate 351 or the back cover 361 or both house the magnets 366, as opposed to the rotor 362, as discussed below.

The rotor 362 includes, in some example embodiments, a plurality of recesses 365 on one or the other side or both of the rotor 362, which in some example embodiments may be in an identical or similar pattern.

Each recess 365 receives a magnet 366 having axial magnetization. The magnets 366 are mounted in a parallel magnetic pole orientation in such a configuration that forms several distinct regions of polarity on the rotor 362. In some example embodiments, the configuration is such that the main flux exiting the rotor 362 is of a common polarity. In some example embodiments, the recesses 365 are laid out in at least one concentric ring of recesses 365 on at least one side thereof. In some example embodiments, the recesses 365 may pass entirely through the rotor 362 and the magnets 366 may be mounted therein so as to extend partly through the rotor 362 on either side thereof.

In some example embodiments, each recess 365 may be substantially ¾" in diameter and substantially ⅛" deep to receive a Neodymium rare earth or other fixed magnet. In some example embodiments, the magnets 366 may be comprised of NdFeB N42 material, have a diameter of substantially 0.750" and a thickness of substantially 0.125", with a magnetic field strength of substantially 13,200 Gauss/ 3,240 surface field Gauss oriented in a direction substantially normal to the plane of the rotor 362. In some example embodiments, the magnets 366 may be electromagnets. In some example embodiments, the total number of magnets 366 disposed on each side of the rotor 362 may be 48.

In some example embodiments, the rotor 362 may be comprised of a magnetic material having a corresponding magnetic pole orientation substantially normal to the plane of the rotor 362, obviating the use of recesses 365 and discrete magnets 366 for mounting in the recesses 365.

In some example embodiments, the rotor 362 acts merely as a conductor and the surrounding pulley plate 351 or back cover 361 or both is magnetized, for example, by introduction of recesses 365 and corresponding magnets 366 in their facing surfaces. In such example embodiments, the materials out of which the rotor 362 and the pulley plate 351 or the back cover 361 or both may be reversed.

The brake 360 thus imparts a braking force to the travel of the cable loop 131 around the pulleys 352, 223 of the brake 360 and receiver 120. In some example embodiments, the rotation of the drive pulley 352 from travel of the cable loop 131 around it causes the transverse axle 354 passing through the drive pulley 352 in fixed rotational engagement therewith to rotate, thus causing the rotor 362 mounted on the axle 354 on the opposite side of the pulley plate 351 to rotate relative to the pulley plate 351 or the back cover 361 or both. A magnetic field imparted between the rotor 362 and the pulley plate 351 or back cover 361 or both, creates eddy currents that oppose the rotation of the rotor 362 and impart a braking force on the rotor 362. This force is transmitted by the transverse axle 354 to slow the rotation of the drive pulley 352 and thus to slow the travel of the cable loop 131 around the drive pulley 352, which slows the descent of the carriage 140 and its supported load in a controlled fashion.

With reference again to FIG. 2, the cable 130 may in some example embodiments comprise a small eyelet 132 at each end to permit the ends of the cable 130 to be joined together to form a cable loop 131. In some example embodiments, the cable eyelets 132 may be fastened together. In some example embodiments, the carriage 140 may be positioned proximate to one of the cable eyelets 132 at one end of the cable 130 and constrained to remain in this position by a cable clamp 133 fixed to the cable 130 so that the carriage 140 lies within a small space between the cable clamp 133 and the cable eye 132. In some example embodiments, the carriage 140 may be fastened to the cable eyelets 132 directly, obviating the cable clamp 133.

The carriage 140 may be engaged in a ready position by the receiver 110 proximate to the structure 10 to provide a mechanism for rapid egress from the structure 10 for personnel or equipment or both. In some example embodiments, the carriage 140 may be released by attaching to the carriage 140 a load (not shown), such as personnel or equipment or both, that exceeds the gripping force of the magnet 233.

In some example embodiments, the carriage 140 may comprise a T-handle 141 or other structure that may be grasped by a worker on the structure 10 such as a sitting shuttle (not shown) or a standing shuttle (not shown). Imparting a load, such as by a worker grasping the T-handle 141, on the carriage forces the carriage 140 to disengage from the receiver 110 and to descend with the load along a path defined by the cable loop 131 to the ground surface 20 proximate to the brake assembly 120.

Once the carriage 140 and its supported load have reached the brake assembly 120, the load may be disengaged from the carriage 140 and the carriage 140 may be moved upward toward the receiver 110 by driving the cable loop 131 to travel in the opposite direction. In some example embodiments, this may be facilitated by mounting a rotatable wheelcrank 628 (FIG. 6) on the transverse axle 354 or other suitable reloading mechanism.

The carriage 140 may be seen to engage the cable loop 131 at two places 144, 145, respectively on the downstream (top) 134 and upstream (bottom) 135 portions of the cable loop 131. The carriage 140 is constrained to lie proximate to the cable eyelets 132, which are joined together to form the cable loop 131, at the first place 144 on the downstream portion 134, by the imposition of the cable clamp 133 on the other side of the carriage 140. The upstream portion 135 of the cable loop 131 passes through and is free to move relative to the carriage 140 at the second place 145, which lies substantially vertically below the first place 144 on the downstream portion 134 of the cable loop 131 when the system 100 is mounted and operational.

A cover (not shown) hinged at one side (in the FIG. 2, the top side) provides internal access to the carriage 140, for maintenance purposes and to provide access for inserting both portions 144, 145 of the cable loop 131 within the carriage 140. The cover may be secured by a central bolt and nut (not shown) and or a secondary safety latch and/or a hinge pin (not shown) inserted through the carriage 140 and bottom side of the cover or both.

A metal spigot 146 extends out of the top of the carriage 140 and is adapted to engage the magnet 233 housed in the receiver seat 224. The magnetic force between the magnet 233 and the spigot 146 maintain the carriage 140 in a ready position proximate to the receiver 110 until a downward load is applied to the carriage 140, such as by a worker gripping the T-handle 141 and exiting the structure 10, which exceeds the gripping force of the magnet 233.

In some example embodiments, a lever (not shown) provides a secondary braking capability which may be employed by a worker suspended from the T-handle 141.

The downstream portion 134 of the cable loop 131 is tucked near the top of the carriage 140, by the hinge. It is constrained in position by the cable eyelets 132 on one side and the cable clamp 133 or swedge (not shown) on the other. The upstream portion 135 of the cable loop 131 is tucked between a secondary brake pad 147 and a freely rotating sheave 148. Unless the secondary brake pad 147 is engaged by pulling on the lever, to which the axle on which the brake pad 147 is mounted is attached, to force the brake pad 147 against the cable loop 131, pinching it between the brake pad 147 and the sheave 148, the upstream portion 145 of the cable loop 131 is free to move relative to the carriage 140, guided by the sheave 148.

In operation, from the ready position, the carriage 140 with suspended load is released from the receiver 110 to descend along the path defined by the downstream portion 134 of the cable loop 131. The drive pulley 352, receiver pulley 223 and cable loop 131 define and lie substantially in a common plane, taking advantage of the pivoting ability of the receiver housing 222 relative to the bracket 212.

Descent of the carriage 140 along the cable loop 131 under load imparts traction between the drive pulley 352 and the cable loop 131 travelling with the carriage 140, which causes rotation of the drive pulley 352, which causes rotation of the transverse axle 354. Rotation of the axle 354 causes rotation of both the rotor 362 and the magnets 366 mounted thereon, such as in recesses 365. Rotation of the magnets 366 causes the magnetic field created by the axial polarity of the magnets 366 to rotate.

The rotational movement of the magnetic field of the rotor 362 relative to the pulley plate 351 and back cover 361 comprising the frame induces eddy currents in the frame in a pattern that mirrors that of the magnetic field created by the magnets 366. Because the eddy currents and the magnetic field mirror each other, they interact to oppose the rotation of the magnetic field. This opposition to rotation of the magnetic field translates to a braking force against the rotation of the magnets 366 in the rotor 362, against the rotation of the axle 354 and against the rotation of the drive pulley 352, slowing the descent of the carriage 140 and suspended load travelling along the cable loop 131. Consequently, the carriage 140 and suspended load make their descent along the path defined by the downstream portion 134 of the cable loop 131 at a controlled rate.

The brake 360 operates passively in braking the cable loop 131 in that there is no applied power or control to operate it. Rather, the rotation of the rotor 362 creates a traveling wave magnetic field relative to the conductive frame. During rotation, the traveling wave magnetic field is in motion relative to a conducting medium such as the frame. The relative motion of this wave induces eddy currents in the conductive medium in a pattern which mirrors that of the driving field. The induced eddy currents interact with the field of the magnets 366 to develop a braking force. As long as the magnets 366 remain magnetized and relative motion is developed between the magnets 366 and the frame, a braking force is generated. The braking force is a function of the relative strengths of one or more of the magnets 366, and induced currents and their relative phase offsets. The magnitude and phase offset of the induced current may vary as a function of the relative wave velocity, magnetic field strengths, wavelength of the field and conductor resistivity.

The strength of the braking force may be proportional to the distance between the rotor 362 and the frame and the thickness of the frame. The braking force may be controlled by adding or removing magnets 366, changing the spacing between the pulley plate 351 and rotor 362, changing the spacing between the back cover 361 and rotor 362, changing the diameter of the pulley plate 351, back cover 361 or rotor 362 or any combination of them, changing the type or strength of the magnets 366; changing the material from which the pulley plate 351, back cover 361, rotor 362, magnets 366 or any combination of them are composed or with which they are cladded or inserted, or changing the number of rotor 361 and frame pairs on the transverse axle 354. In some experiments, machining the pulley plate 351 and back cover 361 to include a 3/16" copper plate resulted in an increase in braking power of at least around 40%.

Because the strength of the eddy currents may be proportional to the velocity of the rotor 362 relative to the stationary frames, as the rate of descent of the carriage 140 increases, the braking force increases. Similarly, decreasing the rate of descent of the carriage 140 decreases the braking force. This proportionality produces a relatively smoother deceleration and allows the carriage 140 to descend in a controlled manner towards the terminal point (not shown), resulting in a relatively gentler landing. Rates of descent of about 14 ft/s (peak at around 22 ft/s) have been experienced for descents from high elevations, while more moderate descent elevations result in rates of descent of about 7-8 ft/s and landing speeds as low as 2 ft/s.

The single movable cable loop configuration permits the cable loop 131 to take steeper descent paths or descent paths through narrower openings between obstacles.

In some example embodiments, including the embodiments described herein, the brake 360 employs the eddy current brake described in FIGS. 8 and 9. In some example embodiments, adequate performance may be obtained by using other conventional brake mechanisms, including disk, drum and cable braking mechanisms in substitution for the eddy current brake described in FIGS. 8 and 9.

As well, the disclosed system 100 is easier to configure, transport, install, move and store away. In some example embodiments, the system 100 may comprise a kit.

While the present disclosure is sometimes described in terms of methods, the present disclosure may be understood to be also directed to various apparata including components for performing at least some of the aspects and features of the described methods, be it by way of hardware components or combinations thereof, or in any other manner. Such apparata and articles of manufacture also come within the scope of the present disclosure.

The various embodiments presented herein are merely examples and are in no way meant to limit the scope of this disclosure. Variations of the innovations described herein will become apparent from consideration of this disclosure and such variations are within the intended scope of the present disclosure.

For example, the magnets 366 could be mounted in the pulley plate 351 or the back cover 361 or both and the eddy currents could be formed in the rotor 362.

Other embodiments consistent with the present disclosure will become apparent from consideration of this specification and the practice of the disclosure set out therein.

According to a first broad aspect of the present disclosure, there is disclosed a descent system for controlling movement of a load between an initial point and a terminal point, the system comprising: a cable formed into a loop; a receiver having a receiver pulley for engaging the cable loop around it at the initial point; a brake assembly having a drive pulley for engaging and being rotated by the cable loop at the terminal point, the brake assembly for slowing the rate of travel of the cable loop around the pulleys; and a carriage secured to the cable for supporting the load and for movement between the initial point and the terminal point as the cable loop travels around the pulleys.

According to a second broad aspect of the present disclosure, there is disclosed a brake assembly for use in a descent system for controlling movement of a load between an initial high point and a terminal low point, the system comprising a cable formed into a loop, a receiver having a receiver pulley for engaging the cable loop around it at the initial point and a carriage secured to the cable for supporting the load, the brake assembly having a drive pulley for engaging and being rotated by the cable loop at the terminal point, the brake assembly for slowing the rate of travel of the cable loop around the pulleys.

According to a third broad aspect of the present disclosure, there is disclosed a kit comprising: a cable for forming into a loop; a receiver having a receiver pulley for engaging the cable loop around it at an initial point; a brake assembly having a drive pulley for engaging and being rotated by the cable loop at a terminal point, the brake assembly for slowing a rate of travel of the cable loop around the pulleys; and a carriage for securing to the cable and for supporting a load for movement between the initial point and the terminal point as the cable loop travels around the pulleys.

Accordingly the specification and the embodiments disclosed therein are to be considered examples only, with a true scope and spirit of the disclosure being disclosed by the following numbered claims.

What is claimed is:

1. A brake assembly, comprising:
   a drive pulley subsystem including an axle in fixed rotational engagement with a drive pulley; and
   a brake including a substantially planar ferromagnetic rotor in fixed rotational engagement with the axle, and at least one conducting frame element, the rotor comprising at least one recess formed in a surface thereof, at least one permanent magnet fixedly disposed within the recess, and the at least one conducting frame element disposed proximate to the rotor, whereby an eddy current may be induced by rotational movement of the rotor relative to the at least one conducting frame element in a direction to oppose acceleration of the drive pulley as it is rotated.

2. The brake assembly of claim 1, wherein the frame is an open framework that substantially encloses and protects the axle and the brake.

3. The brake assembly of claim 2, wherein the frame includes a pair of substantially parallel sides, spaced apart by a plurality of cross beams.

4. The brake assembly of claim 1, wherein the brake mount has a base, at least one pivot plate, and a tensioner.

5. The brake assembly of claim 4, wherein the base extends substantially vertically from the mount and extends, in a substantially vertical plane, to engage the at least one pivot plate.

6. The brake assembly of claim 1, wherein the drive pulley subsystem further includes a pulley plate and at least one idler sheave.

7. The brake assembly of claim 6, wherein the pulley plate has a transverse bore sized to accommodate the axle to engage and drive the rotor of the brake.

8. The brake assembly of claim 7, wherein the pulley plate is sandwiched between a pair of pivot plates of the brake mount, and secured to the pivot plates by a pulley bolt.

9. The brake assembly of claim 6, wherein the at least one idler sheave is mounted on a same side of the pulley plate as the drive pulley.

10. The brake assembly of claim 1, wherein the pulley has a key cut at a center of the drive pulley to accept the axle in fixed rotational engagement.

11. The brake assembly of claim 1, wherein the conducting frame element of the brake further a conductive back cover that engages a pulley plate of the drive pulley subsystem.

12. The brake assembly of claim 11, wherein the back cover encloses and accepts a distal end of the axle and does not contact any part of the rotor.

13. The brake assembly of claim 12, wherein the back cover defines a cavity region that accommodates the rotor lying in a plane substantially parallel to a plane of the pulley plate and substantially normal to an axis of the axle.

14. The brake assembly of claim 13, wherein a rotation of the rotor relative to the pulley plate and the back cover induces the eddy currents in either or both of the pulley plate and the back cover.

15. The brake assembly of claim 1, wherein the at least one recess includes a plurality of recesses, and the at least one permanent magnet includes a plurality of permanent magnets, the permanent magnets mounted in a parallel magnetic pole orientation in the recesses.

16. The brake assembly of claim 15, wherein a configuration of the magnets is such that a main flux exiting the rotor is of a common polarity.

17. The brake assembly of claim 15, wherein the recesses are arranged in at least one concentric ring on at least one side of the rotor.

18. A brake assembly, comprising: a drive pulley subsystem including an axle in fixed rotational engagement with a drive pulley; and a brake including a substantially planar ferromagnetic rotor in fixed rotational engagement with the axle, and at least one conducting frame element, the rotor comprising at least one recess formed in a surface thereof, at least one permanent magnet fixedly disposed within the recess, and the at least one conducting frame element disposed proximate to the rotor, whereby an eddy current may be induced by rotational movement of the rotor relative to the at least one conducting frame element in a direction to oppose acceleration of the drive pulley as it is rotated;
    a brake mount;
    wherein the drive pulley subsystem further includes a pulley plate and at least one idler sheave;
    wherein the pulley plate has a transverse bore sized to accommodate the axle to engage and drive the rotor of the brake;
    wherein the pulley plate is sandwiched between a pair of pivot plates of the brake mount, and secured to the pivot plates by a pulley bolt.

* * * * *